Sept. 13, 1932.  DE FOREST KELLOGG  1,877,134
HYDRAULIC BRAKE
Filed April 2, 1930  3 Sheets-Sheet 1

Fig.1.

Inventor
De Forest Kellogg
by Hazard and Miller
Attorneys.

Patented Sept. 13, 1932

1,877,134

UNITED STATES PATENT OFFICE

DE FOREST KELLOGG, OF LOS ANGELES, CALIFORNIA

HYDRAULIC BRAKE

Application filed April 2, 1930. Serial No. 440,994.

This invention relates to hydraulic brakes, and has for an object the provision of an improved type of braking mechanism, which, while being capable of practically universal application wherever it is desired to develop a braking action between two relatively movable parts of a mechanism, is particularly adapted for heavy duty service such as that encountered by the braking mechanisms with which heavy automotive trucks are equipped.

A more detailed object is the provision of a braking mechanism of extremely rugged design, and which is of such a nature that it is operable with the utmost ease in order to develop a maximum degree of braking action, and still is extremely positive in operation. With this object in view, the constituent elements of the braking mechanism are so designed and arranged that the liability of failure of operation of any of the parts, is reduced to an absolute minimum.

Another object is to provide a hydraulic braking mechanism which includes an impeller movable within a fluid-filled chamber, and means for restricting the motion of the fluid within the chamber, with means for connecting the impeller to one of the relatively movable members between which it is desired to develop braking action, and in which the connecting means are releasable so as to permit free running of the movable parts at all times when it is not desired to develop such breaking action.

Another object is to provide means for detachably connecting the impeller to its associated member, this means being in the form of teeth on the member and engageable with complementary teeth on the impeller, this type of connecting means being capable of developing a positive connection adapted to prevent any possibility of slippage between the members when the teeth are interlocked.

A further object is to provide clutch means for synchronizing the impeller with the member before inter-engagement of their teeth, and thus facilitate the step of bringing the teeth into mesh with each other.

A still further object is to provide a braking mechanism of the general class described, in which means are provided for by-passing fluid from one side of the means for preventing flow within the chamber, to the other side thereof, and with variable means for controlling the rate of flow through the by-pass.

An additional object is to provide interconnecting mechanism whereby the clutch means above referred to, are first engaged, and the teeth of the impeller subsequently engaged with the teeth of the associated member; and upon continued movement of the inter-connecting means, the restriction of the by-pass is effected, this restriction increasing as the further movement of the inter-connecting means is continued.

Another object is the provision of a hydraulic braking mechanism having the above described characteristics in which an equal degree of braking efficiency is developed regardless of the direction of movement of the members with respect to each other.

The invention possesses other objects and advantageous features, some of which, with those enumerated, will be set forth in the following description of the invention's particular embodiment which is illustrated in the drawings accompanying and forming a part of the specification.

Referring to the drawings.

Broadly considered, the braking mechanism of the present invention is designed to develop any desired degree of braking action between two relatively movable members, such for example, as the axle of an automobile truck and the housing within which the axle is revoluble. A housing for the braking mechanism is carried by one of the members, and an impeller is movable therein, this impeller being so arranged that when motion thereof in respect to the housing occurs, fluid is forced by the impeller, through a system of conduits provided with suitable valve means for controlling the flow therethrough. Therefore, when the valve means are adjusted to restrict the flow of fluid therepast, braking action will be developed, the magnitude of which is in direct proportion to the extent of such restriction. Means are provided for connecting the impeller to the other of the relatively movable members, and these connecting means are releasable so as to remove all drag between the relatively movable members when it is not desired to apply the brakes. Furthermore, this connecting means includes a positive connecting device such as interlocking teeth, and a friction device such as a clutch; the parts being so arranged that the clutch is first engaged to cause motion of the impeller in synchronism with the associated movable member before the positive connecting means become engaged. The valve means for controlling the flow of fluid, are operable upon further continued movement of the means whereby the connecting means are actuated; with the result that it is necessary for the operator to move but a single element such as a brake pedal, in order to first effect connecting the impeller to its associated movable member, and then restriction of the flow of fluid which is caused by motion of the impeller in respect to the other of the members.

Figure 1:
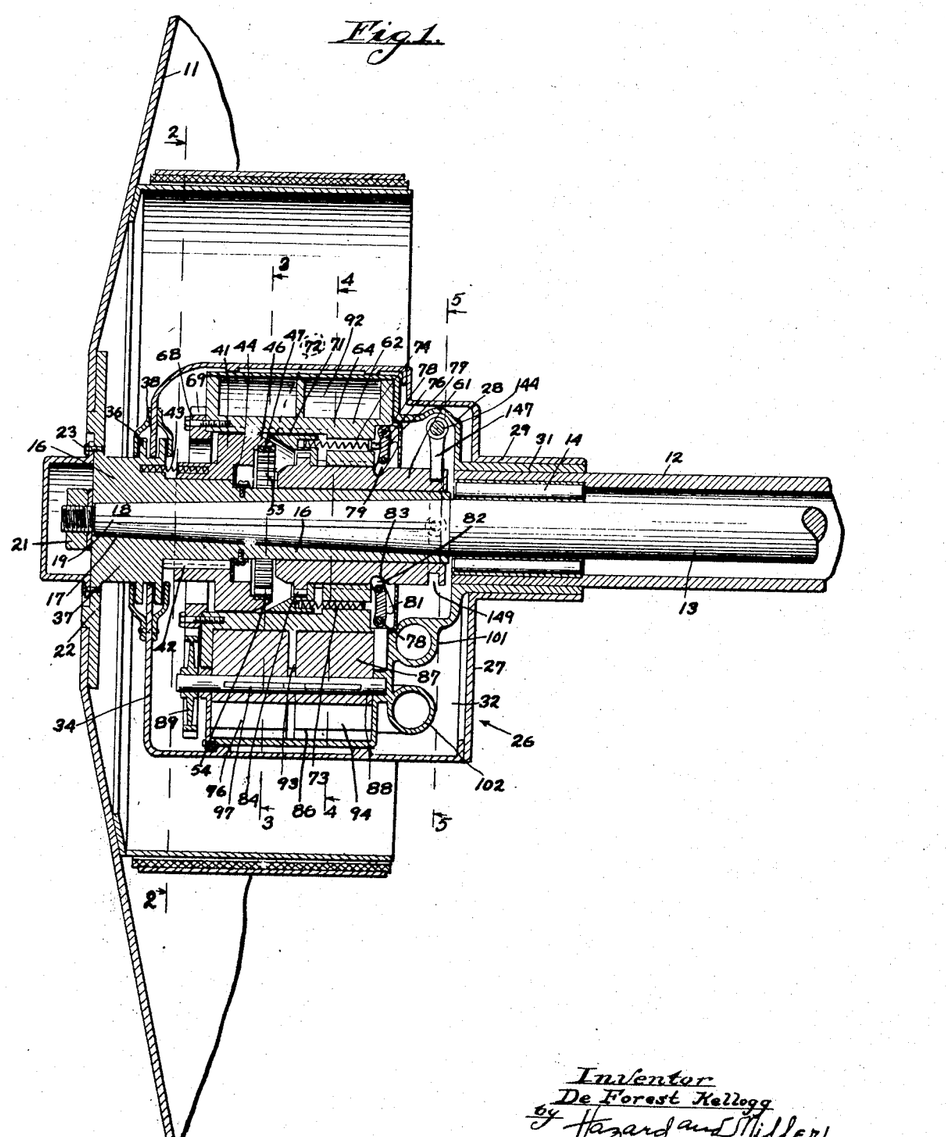
Figure 1 is a vertical, medial sectional view through a portion of a wheel and axle of a truck, and a braking mechanism incorporating the principles of the present invention operatively installed thereupon.
Figure 2:
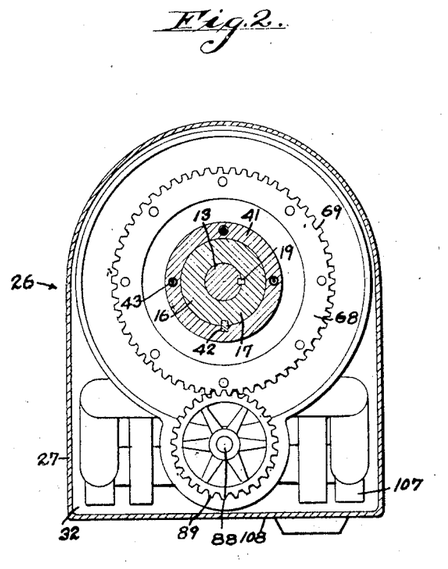
Fig. 2 is a transverse, vertical sectional view, the plane of section being taken upon the line 2—2 of Fig. 1, with the direction of view as indicated.

Specifically describing that embodiment of the invention which at present is deemed to be the most practical, it is herein shown as having been operatively installed to develop braking action between a wheel 11 of a motor truck and the axle housing 12 associated therewith. The wheel 11 is carried by an axle 13 which is journalled through the expedient of a conventional anti-friction bearing 14 within the axle housing 12. A suitable hub 16 is rigidly secured adjacent the end of the axle 13 between the end of the axle housing 12 and the wheel 11. The bore 17 of the hub 16, is preferably tapered so as to establish a more rigid connection with the axle 13, a portion 18 of which is complementarily tapered so as to fit accurately therein. A suitable key 19 is employed to prevent rotation of the hub 16 upon the axle 13, and displacement of the hub from the axle is prevented by means of a nut 21 threaded onto the outer end of the axle 13. The hub 16 is provided with a flange 22 to which the wheel 11 is secured in any convenient manner, such as by rivets 23.

Figure 3:
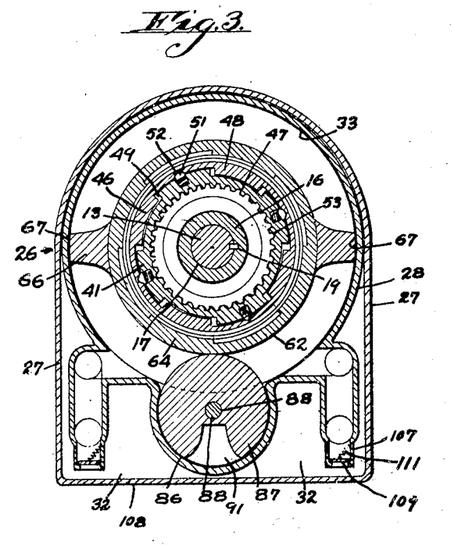
Fig. 3 is a similar view taken upon the line 3—3 of Fig. 1, with the direction of view as indicated.

A housing 26 for the braking mechanism, is rigidly mounted upon the axle housing 12. Preferably this housing 26 consists of an outer portion 27 and an inner portion 28, both of which are firmly attached to the axle housing 12 by means of annular flanges 29 and 31 respectively, which are preferably shrunk onto the axle housing 12 so as to impart the maximum degree of rigidity therebetween. The outer portion 27 of the housing 26, provides a reservoir 32 for the storage of a reserve supply of hydraulic fluid, and the inner portion 28 is constructed so as to provide a fluid chamber 33 which is circular in cross-sectional configuration as best shown upon Figs. 3 and 4. This chamber 33 is so disposed that the axle 13 and hub 16 extend axially therethrough.

Inasmuch as the axle 13 must extend through the outer end 34 of the outer portion 27 of the housing 26, I have provided means for preventing undue escape of hydraulic fluid from the reservoir 32. For this purpose, preferably a plurality of flanges 36 are formed upon an enlarged portion 37 at the outer end of the hub 16. Other flanges 38 carried by the inner portion 28 of the housing 26, are positioned between flanges 38 and extend inwards in alternation with the flanges 36 of the hub 16. The reservoir 32 will not necessarily have to be filled to a level higher than the lowest portion of the hole in the outer end 34 of the portion 27 of the housing 26; and the flanges 36 and 38 will serve to efficiently prevent leakage of fluid therepast which might otherwise occur as a result of splashing.

A head 41 is mounted for rotation with the axle 13, by being splined to the hub 16 in any convenient manner such as my means of the conventional feather key 42. A plurality of coil springs 43 are under compression between the head 41 and the enlarged portion 37 of the hub 16, these springs 43 being arranged to continually urge the head 41 longitudinally upon the hub 16, and into engagement with a collar 44 rigid with the hub 16 in position to limit inward movement of the head 41.

An annular shoulder 46 is rigid with, and extends inwards from the head 41; and a ring 47 is splined within the shoulder 46 through the expedient of a plurality of radial projections 48 extending outwards from the outer circumference of the ring 47 and received within recesses 49 in the inner circumference of the shoulder 46. However, the recesses 49 are slightly wider than the projections 48, thus permitting a limited degree of rotational movement of the ring 47 with respect to the shoulder 46 and head 41. The projections 48 are normally retained centrally of their respective recesses 49, by means of spring-pressed balls 51 carried by the ring 47 and seating within complementary pockets 52 in the shoulder 46. Gear teeth 53 are formed on the inner circumference of the ring 47, and it is these teeth whereby interconnection is established between the hub 16 and the impeller, as will be described hereinafter.

The outer surface 54 of the annular shoulder 46 is beveled, (see Fig. 1) i. e., is conical in configuration, and it is this conical surface 54 which serves as one element of the clutch device whereby synchronization is established between the hub 16 and the impeller before positive engagement therebetween, occurs, as will also be explained hereinafter.

Figure 4:
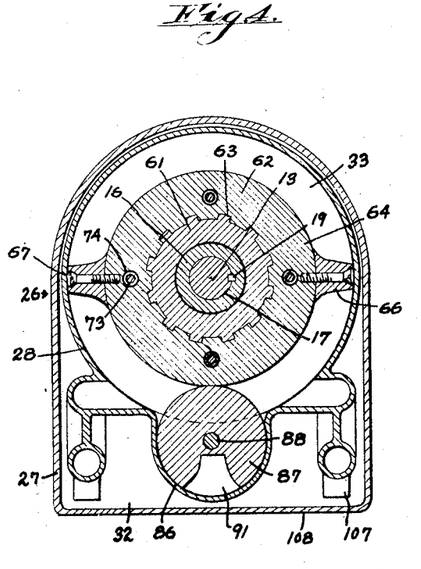
Fig. 4 is a similar view taken upon the line 4—4 of Fig. 1, with the direction of view as indicated.

A sleeve 61 is mounted for free rotational and sliding movement upon the hub 16; and an impeller 62 is mounted upon the sleeve 61 for free longitudinal movement thereupon, but is connected thereto for rotation therewith through a splined connection 63, best shown upon Fig. 4. The impeller 62 includes a hub 64, and preferably a pair of opposed blades 66, which are of such length that their outer edges 67 are situated closely adjacent and preferably establish sliding contact with the bore of the circular fluid chamber 33, as shown upon Figs. 3 and 4. The outer end of the hub 64 is counterbored and extends outwards beyond the head 41, where an annular flange 68 is secured thereto and gear teeth 69 are formed upon the outer circumference of the flange 68.

A clutch member 71 is splined to the impeller 62 as by splines indicated at 72, within the counterbored portion of its hub, this clutch element 71 being adapted to cooperate with the conical surface 54 when pressed into frictional engagement therewith to cause rotation of the impeller 62 with the head 41, which in turn is carried by the hub 16. For the purpose of sliding the clutch member 71 into engagement with the conical surface 54, a plurality of springs 73 are interposed between the clutch member 71 and the hub 64 of the impeller 62. Each spring 73 seats within a hole 74 in the hub 64 where it is adapted to be pushed in a direction parallel to the axis of the axle 13, by means of a headed pin 76 which extends into the other end of each of the holes 74. Each of the headed pins 76 is carried by a lever 77 which is pivoted for swinging movement about a pivot pin 78 extending transversely of the axle 13. A secondary lever 79 is pivoted to each of the levers 77, beyond the point at which the associated pin 76 is carried. The outer end 81 of each of the secondary levers 79, bears against a portion of the hub 64 of the impeller, whereas the inner end 82 of each secondary lever 79, seats within an annular groove 83 in the sleeve 61, the arrangement being such that when the sleeve 61 is slid to the left as viewed upon Fig. 1, it causes pivotal movement of all of the secondary levers 79, which in turn cause pivotal movement of the primary levers 77, but at a reduced rate. This movement of the primary levers 77, causes the several pins 76 to move to the left as viewed upon Fig. 1, but through a distance considerably less than that traversed by the sleeve 61, this distance being sufficient however, to cause the clutch member 71 to engage the conical surface 54.

Gear teeth 84 are formed upon the sleeve 61 adjacent its outer end, these teeth being engageable with the teeth 53 on the ring 47, after the sleeve 61 has been slid far enough to effect such engagement. However, the spacing between the conical surface 54 and the clutch member 71 when the sleeve 61 is in retracted position, is so slight that the clutch becomes engaged before the teeth, resulting in imparting rotational movement to the impeller 62 with the hub 16 and axle 13, before interengagement of the teeth 84 and 53 occurs. This synchronization of the parts, is for the purpose of facilitating enmeshing of the gears, which would be difficult and perhaps impossible if the synchronizing means were not provided.

Means are provided for permitting unrestricted motion of the blades 67 as they rotate within the fluid chamber 33, but for preventing the motion of fluid between the wall of the chamber and the hub 64 of the impeller 62, and thus developing a braking action between the axle 13 and the housing 12. A recess 86 is formed in the wall of the chamber 33 at its lower side, and a cylinder 87 is journalled within the recess 86 by means of a suitable shaft 88. The parts are so proportioned that the cylinder 87 extends from the recess 86, to make tangential contact with the hub 64 of the impeller 62; and the diameter of the hub 64 is a multiple of that of the cylinder 87, the purpose being to bring a given point on the circumference of the hub, into engagement with the same point on the circumference of the cylinder 87, each time the impeller 62 is rotated. Inasmuch as the present modification shows two impeller blades 66, the cylinder 87 has been constructed with a diameter just half that of the hub 64; with the result that as these two parts rotate in opposite directions, the cylinder 87 rotates twice as fast as the impeller 62.

Means are provided for positively effecting such rotation, this means preferably being in the form of a gear 89 carried by the shaft 88 and enmeshed with the teeth 69 which are formed by the flange 68, this flange being rigidly connected to the impeller 62, as explained hereinabove. A socket 91 is provided in the cylinder 87, this socket 91 being in the form of a groove extending longitudinally of the cylinder 87. The parts are so proportioned and arranged that as the impeller 62 and cylinder 87 rotate in opposite directions, the blades 67 will alternately be received within the socket 91. Furthermore, the parts are so designed that whenever either of the blades 67 is seated within the socket 91, at least one line of contact will be established between that blade and the cylinder, so as to prevent leakage of fluid past the blade. The rotation of the cylinder 87 however, permits passing of the blades 67 therepast, as will readily be understood.

I prefer to divide the fluid chamber 33 into a plurality of annular compartments. In the present instance, two such compartments 92 are shown, these compartments being separated by an annular flange 93 extending outwards from the hub 64 of the impeller 62, into proximity with the bore of the chamber 33. Hence, the cylinder 87 is formed in two portions 94 and 96, both of which are rigidly attached to the shaft 88 as by keys 97. These portions 94 and 96 are spaced for the reception of the flange 93 therebetween, as clearly shown upon Fig. 1.

Figure 5:
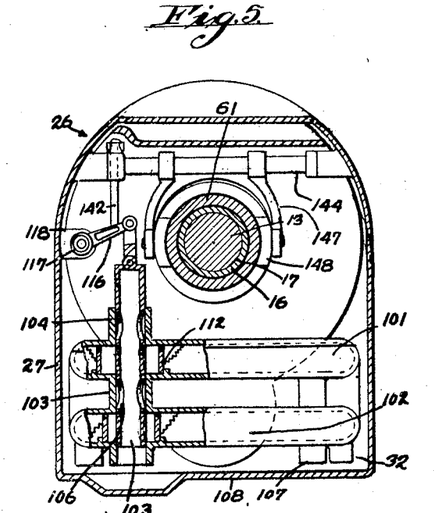
Fig. 5 is a similar view taken upon the line 5—5 of Fig. 1, with the direction of view as indicated, and showing the valve in braking position.

A by-pass 101 is associated with each of the compartments 92 of the fluid chamber 33. Each of these by-passes 101 establishes communication with its associated compartment upon opposite sides of the cylinder 87. Each by-pass 101 is in the form of a tube communicating at its ends with its associated compartment 92, closely adjacent the recess 86 within which the cylinder 87 is journalled, the two tubes 101 being separate from each other and arranged with their central portions 102 in vertical alignment as best shown upon Figs. 1 and 5. This arrangement permits of the accommodation of a single tubular valve 103 to control the flow through both by-passes 101. For this purpose a valve chamber 104 is constructed preferably integrally with both by-passes 101 and communicating therewith, and the tubular valve 103 is vertically reciprocable therein. Ports 106 are formed in the tube forming the valve 103, in such position that both ends of both by-passes 101 may be put put into communication with the bore of the tube 103 simultaneously. The tube 103 is open at the bottom, so that when the ports 106 are in register with the by-pass 101, fluid may flow therefrom, into the reservoir 32.

The tubular valve 103 serves as an outlet only, for the fluid from the chamber 33. However, each by-pass 101 is provided with two inlets. These are in the form of a tube 107 extending downwards from adjacent each end of each by-pass 101, to a position proximal to the bottom 108 of the reservoir 32. A check valve 109 preferably provided with a spring 111, is provided at the bottom end of each of the tubes 107, and these check valves 109 are so arranged that they will permit entry of fluid from the reservoir 32 into their respective by-passes 101, but will positively prevent escape therepast, of fluid from the by-pass into the reservoir. Inasmuch as the tubular valve 103 is for the sole purpose of permitting withdrawal of fluid from the fluid chamber 33, additional check valves 112 are provided in each of the by-passes 101 upon each side of the valve 103, these check valves 112 being arranged to permit escape of fluid to the tubular valve 103, but to prevent flow of fluid therepast in the opposite direction.

Figure 6:
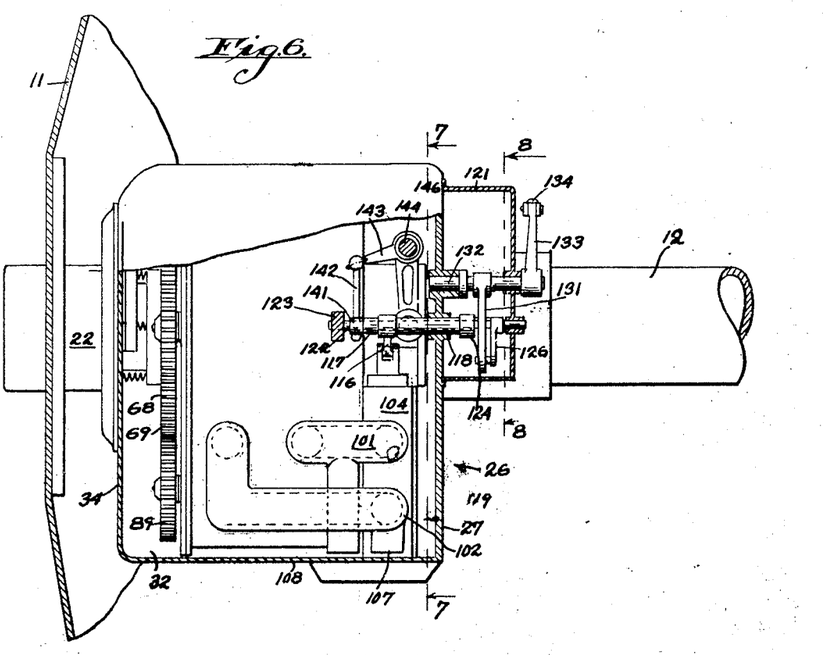
Fig. 6 is a view partially in elevation, of the braking mechanism, with a portion of the housing broken away to better disclose the inter-connecting means forming a portion of the present invention.
Figure 7:
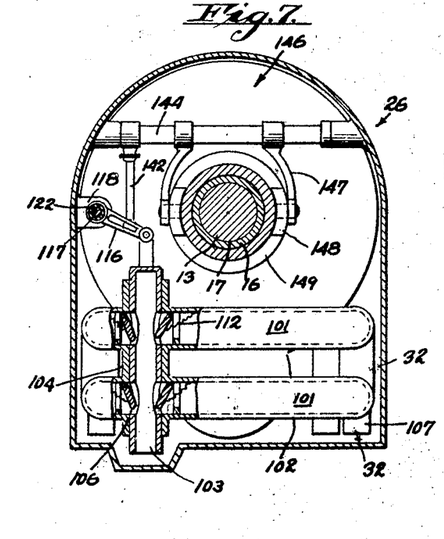
Fig. 7 is a vertical sectional view taken upon the line 7—7 of Fig. 6, with the direction of view as indicated, and showing the valve moved to brake-releasing position.
Figure 8:
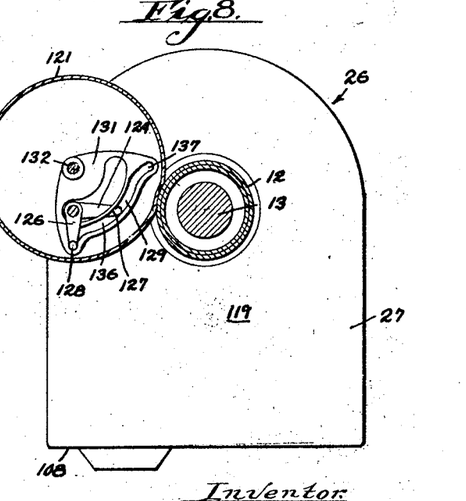
Fig. 8 is a vertical sectional view taken upon the line 8—8 of Fig. 6, with the direction of view as indicated.

Reciprocation of the tubular valve 103 is effected by means of a crank 116 which is carried by a tubular shaft 117, through a journal 118 in the inner wall 119 of the outer portion 27 of the housing 26, and into an auxiliary housing 121 wherein the interconnecting mechanism is contained. A second shaft 122 is journalled within the tubular shaft 117, the inner end of this shaft 122 being mounted for rocking movement within a lug 123 on the inside of the outer portion 27 of the housing 26. Cranks 124 and 126 are affixed to the shafts 117 and 122 respectively, within the auxiliary housing 121, the cranks 124 and 126 being provided with pins 127 and 128 respectively, which are received within a slot 129 in a quadrant plate 131. This plate 131 is carried by a stub shaft 132 which is journalled across the auxiliary housing 121 in parallelism with the shafts 117 and 122. The stub shaft 132 extends to the exterior of the auxiliary housing 121, where it carries a crank 133 to which the brake rod 134 is pivoted in such a manner that the actuation of a suitable lever or pedal (not shown) will cause rotational movement of the stub shaft 132 and quadrant plate 131. The slot 129 includes a portion 136 which is arcuate about the axis of the stub shaft 132. Each end 137 of the slot 129 is deflected however, so as to extend outwards in respect thereto; and when the parts are in retracted position, i. e., when the brake is fully released, the pin 128 is seated within the deflected end 137 which leads during rotation of the quadrant plate 131, in that direction which causes application of the brakes. Hence, upon initial rotation of the quadrant plate 131 in this direction, a certain degree of rotational movement will be imparted to the crank 126 and the shaft 122 to which it is affixed. Adjacent the inner end of the shaft 122, a crank 141 is secured, and a link 142 is pivoted for universal movement to the outer end of the crank 141. The link 142 is also universally connected to the outer end of a crank 143, which in turn is rigidly secured to a shaft 144 carrying a yoke 146. Each of two arms 147 of the yoke 146, carries a slipper 148, and both slippers 148 are slidably received within a groove 149 cut in the sleeve 61; with the result that when swinging movement is imparted to the yoke 146 as a result of rotational movement of the shaft 144, the sleeve 61 will be slid longitudinally of the hub 16. The parts are so proportioned and arranged that sufficient sliding movement of the sleeve 61 will be effected to cause engagement first of the clutch member, and then of the teeth 84 and 53, before the pin 128 slips out of the deflected end 137 of the slot 129 and into the arcuate portion 136 thereof. Furthermore, the length of the arcuate portion 136 is such that as soon as the pin 128 has moved thereinto, the pin 127 which is carried by the crank 124, will start moving into the deflected portion 137 at the opposite end of the arcuate portion 136 of the slot 129; with the result that continued rotational movement of the quadrant plate 131 will cause rotational movement of the tubular shaft 117, which in turn will cause the tubular valve 103 to slide within its valve chamber 104 in such a manner as to move the ports 106 of the valve out of registry with the by-passes 101, it being understood that when in non-braking position, the ports 106 are in register with the by-passes 101.

*Operation*

As hereinabove explained, initial rotary movement of the quadrant plate 131 will cause, through the engagement of the pin 128 within its associated deflected portion 137 of the slot 129, the shaft 122 to be turned far enough to first bring the clutch member 71 into engagement with the conical surface 54, and next to bring the teeth 84 into mesh with the teeth 53. As soon as the clutch member 71 has frictionally engaged the conical surface 54, the impeller 62 will be set into rotation within the fluid chamber 33, it being assumed that the wheel 11 and axle 13 are rotating with respect to the axle housing 12, and fluid chamber 33 which is affixed thereto. This will result in rotating the teeth 84 which are carried by the sleeve 61 at the same rate as that at which the teeth 53 which are carried by the head 41, are rotating, thus facilitating entry of the teeth of one set between the teeth of the other set. Should it develop however, that the proximal ends of the teeth 84 and 53 come into abutment instead of the teeth of one set coming into register with the spaces between the teeth of the other set, continued movement of the sleeve 61 will cause compression of the springs 43 by sliding the head 41 outward. The imposition of such spring tension however, will result in urging the head 41 inwards against the ends of the teeth 84 with sufficient force to cause the teeth 53 to move into spaces between the teeth 84 as soon as proper registration has been established; and it is obvious that instantly any resistance to the rotation of the impeller 62 is developed, the sleeve 61 through its splined connection to the impeller 62, will move rotationally in respect to the head 41, permitting the proper registry of the teeth and intertooth spaces, to permit proper enmeshing of the teeth 84 and 53. The rotational play which is permitted to develop between the head 41 and the ring 47 which carries the teeth 53, goes to the same end, inasmuch as under those circumstances, when the displacement of the teeth of one set from the spaces between the teeth of the other set is relatively slight, the ring 47 will be thrust into the slight degree of rotational movement with respect to the head 41, which is necessary to permit proper enmeshing of the teeth 84 and 53 without the necessity of having to wait until resistance is offered to the rotation of the impeller 62.

Since meshing of the teeth 84 and 53 occurs after the clutch member 71 has engaged the conical surface 54, it is necessary to provide some flexible connection between the clutch member 71 and the sleeve 61 whereby it is carried. The springs 73 serve this purpose and permit further movement of the sleeve 61 after the clutch has been engaged.

Rotation of the impeller 62 with the axle 13 as a result of the engagement of the clutch member and teeth as hereinabove described, will cause circulation of fluid within the fluid chamber 33, it being understood that the reservoir 32 has been supplied with the necessary quantity of fluid. Let it be assumed that the direction of rotation of the impeller is in a clockwise direction as viewed upon Figs. 2 to 5 inclusive. Inasmuch as the blades 66 are permitted to pass the cylinder 87 but the fluid is not, the fluid will be forced out of the chamber 33 through the by-passes 101 and to the tubular valve 103 whence it passes into the reservoir 32. The decreased pressure within the chamber 33 upon the left hand side of the cylinder 87 as viewed upon these figures, will cause fluid to be picked up through the tubes 107 upon the left hand side of these figures, past the associated check valves 109, and thence into the chamber 33. Here it is carried circumferentially around the fluid chamber 33 until it is again forced therefrom through the by-passes 101, it being remembered that in order to escape from the by-pass 101, it must pass through one of the ports 106, into the bore of the tubular valve 103, and thence into the bottom of the reservoir 32. Accordingly, braking action may be developed resistive to relative rotation of the wheel 11 and axle 13 in respect to the axle housing 12 and the parts associated therewith, by moving the tubular valve 103 so as to decrease the effective area of the ports 106 in register with the by-passes 101. If the valve 103 is moved far enough to completely shut off the by-passes 101, the maximum braking effort will be developed, inasmuch as under the circumstances, there will be no escape for the fluid from the chamber 33. As explained hereinabove, such movement of the tubular valve 103 is effected by continuation of the movement of the brake rod 134, so as to cause the stub shaft 132 to rotate beyond that position necessary to cause interengagement of the toothed connection between the sleeve 61 and the head 41.

Reverse movement of the brake rod 134, i. e., when foot pressure is relieved from the brake pedal in the event that the brake rod 134 is connected to such an actuating member, will cause successive operation of the parts in the reverse order. The first result of such reverse movement of the brake rod 134, is the positioning of the tubular valve 103 with its ports 106 fully in register with the by-pass 101, permitting unrestricted flow of fluid from the chamber 33 so that no braking action is developed. Continued releasing movement of the brake rod 134, will cause the retraction of the sleeve 61, which in turn effects disengagement of the teeth 81 from the teeth 53, and subsequently, disengagement of the clutch member 71 from the conical surface 54. It is obvious therefore, that after such complete disengagement, the impeller will in no way be connected to the axle 13; with the result that absolutely no resistance is offered to the free running of the parts when the brakes are not set, i. e., there will be absolutely no "drag".

It is obvious from the arrangement of the tubes 107 and the check valves 109 and 112 associated therewith, that the braking mechanism of the present invention is capable of operating with the same high degree of efficiency regardless of the direction in which the wheel 11 is rotating with respect to the axle housing 12, the only change in the operation for reversal of direction of rotation, is that the fluid will be drawn into the tubes 107 upon the opposite side of the housing 26, and circulate through the fluid chamber 33, in the opposite direction.

It is to be understood that the details of the invention as herein disclosed, are subject to alteration within the spirit or scope of the appended claims.

I claim:

1. A braking mechanism comprising a pair of relatively revoluble members, a housing rigid with one of said members, a fluid therein, means actuated by the other of said members during relative movement thereof for moving said fluid within the housing, means for restricting movement of the fluid, releasable means for locking said fluid-moving means to its actuating member for movement therewith in respect to the other of said members, and means operable prior to operation of said locking means for synchronizing said fluid-moving means with its actuating member.

2. In a hydraulic brake, a rotary member, a fluid impeller mounted for free rotation in respect thereto, releasable means for locking said impeller to said rotary member to be rotated thereby, and means operable prior to the operation of said locking means for synchronizing said impeller with said rotary member.

3. A hydraulic braking mechanism comprising a housing having therein a circular fluid chamber, a shaft journalled axially of said chamber, an impeller rotatable within said chamber by said shaft, said impeller comprising a hub and a blade extending therefrom, a cylinder journalled within a recess in a wall of said chamber and extending therefrom into tangency with said hub, said cylinder having a socket therein and said blade being receivable within said socket, and means for rotating said cylinder and said impeller in synchronism with each other to bring the socket into register with the blade during each revolution thereof.

4. A hydraulic braking mechanism comprising a housing having therein a circular fluid chamber, a shaft journalled axially of said chamber, an impeller rotatable within said chamber by said shaft, said impeller comprising a hub and oppositely disposed blades extending therefrom, and a cylinder journalled within a recess in a wall of said chamber and extending into the chamber into tangency with said hub, the radius of said hub being a multiple of that of the cylinder, and said cylinder having a socket therein within which the blades are alternately receivable as the cylinder and impeller rotate together.

5. A hydraulic braking mechanism comprising a housing having therein a circular fluid chamber, a shaft journalled axially of said chamber, an impeller rotatable within said chamber by said shaft, said impeller comprising a hub and oppositely disposed blades extending therefrom, a cylinder journalled within a recess in a wall of said chamber and extending into the chamber into tangency with said hub, the radius of said hub being a multiple of that of the cylinder, and said cylinder having a socket therein within which the blades are alternately receivable as the cylinder and impeller rotate together, and means for rotating said cylinder in synchronism with said impeller to bring said socket alternately into register with said blades.

6. A hydraulic braking mechanism comprising a housing having therein a circular fluid chamber, a shaft journalled axially of said chamber, an impeller rotatable within said chamber, releasable means for coupling said impeller to said shaft to be rotated thereby, said impeller comprising a hub and a blade extending therefrom, means at one side of said chamber restricting flow of fluid between said hub and said chamber, and means associated with said restricting means for passing said blade therepast.

7. A hydraulic braking mechanism comprising a housing having therein a circular fluid chamber, a shaft journalled axially of said chamber, teeth carried by said shaft for rotation therewith, a sleeve revoluble on said shaft and having teeth thereon, means for advancing said sleeve to engage its teeth with those carried by the shaft, an impeller rotatable with said sleeve and including a hub and a blade extending therefrom adjacent the wall of said chamber, and a cylinder journalled within a recess in a wall of said chamber and extending therefrom into tangency with said hub, said cylinder having a socket therein and said blade being receivable within said socket in rotating past the cylinder.

8. A hydraulic braking mechanism comprising a housing having therein a circular fluid chamber, a shaft journalled axially of said chamber, teeth carried by said shaft for rotation therewith, a sleeve revoluble on said shaft and having teeth thereon, means for advancing said sleeve to engage its teeth with those carried by the shaft, clutch means interposed between said shaft and said sleeve and engageable upon advance of the sleeve to rotate the sleeve in synchronism with said shaft before engagement of the teeth, an impeller rotatable with said sleeve and including a hub and a blade extending therefrom adjacent the wall of said chamber, and a cylinder journalled within a recess in a wall of said chamber and extending therefrom into tangency with said hub, said cylinder having a socket therein and said blade being receivable within said socket in rotating past the cylinder.

9. A hydraulic braking mechanism comprising a housing having therein a circular fluid chamber, a shaft journalled axially of said chamber, a head splined to said shaft for rotation therewith, said head being slidable longitudinally on the shaft, teeth on said head, a sleeve revoluble on said shaft and having teeth thereon, means for advancing said sleeve to engage its teeth with those carried by the shaft, clutch means interposed between said shaft and said sleeve and engageable upon advance of the sleeve to rotate the sleeve in synchronism with said shaft before engagement of the teeth, spring means interposed between said shaft and said head urging the head toward the sleeve, an impeller rotatable with said sleeve and including a hub and a blade extending therefrom adjacent the wall of said chamber, and a cylinder journalled within a recess in a wall of said chamber and extending therefrom into tangency with said hub, said cylinder having a socket therein and said blade being receivable within said socket in rotating past the cylinder.

10. A hydraulic braking mechanism comprising a housing having therein a circular fluid chamber, a shaft journalled axially of said chamber, a head splined to said shaft for rotation therewith, said head being slidable longitudinally on the shaft, teeth on said head, a sleeve revoluble on said shaft and having teeth thereon, means for advancing said sleeve to engage its teeth with those carried by the shaft, clutch means interposed between said shaft and said sleeve and engageable upon advance of the sleeve to rotate the sleeve in synchronism with said shaft before engagement of the teeth, spring means interposed between said shaft and said head urging the head toward the sleeve, spring means interposed between said clutch means and said sleeve, an impeller rotatable with said sleeve and including a hub and a blade extending therefrom adjacent the wall of said chamber, and a cylinder journalled within a recess in a wall of said chamber and extending therefrom into tangency with said hub, said cylinder having a socket therein and said blade being receivable within said socket in rotating past the cylinder.

11. In a hydraulic braking mechanism, a housing having a circular fluid chamber and a reservoir therebelow, a shaft revoluble in respect to said housing and arranged axially of said chamber, an impeller rotatable in said chamber by said shaft, means at one side of the chamber for preventing flow of fluid between the wall of the chamber and said impeller, a bypass communicating with the interior of the chamber on each side of said flow-preventing means, a three-way valve interposed in said bypass and adapted to establish communication between said reservoir and each end of the bypass, a tube leading from the reservoir to each end of the bypass, and a check valve in each tube permitting entry of fluid thereinto from the reservoir but preventing escape of fluid therefrom into the reservoir.

12. A hydraulic braking mechanism comprising a housing having therein a circular fluid chamber, a shaft journalled axially of said chamber, teeth carried by said shaft for rotation therewith, a sleeve revoluble on said shaft and having teeth thereon, means for advancing said sleeve to engage its teeth with those carried by the shaft, an impeller rotatable with said sleeve within said chamber, means at one side of the chamber for preventing flow of fluid between the wall of the chamber and said impeller, a bypass communicating with the interior of the chamber on each side of said flow-preventing means, a valve interposed in said bypass, and means for operating said valve.

13. A hydraulic braking mechanism comprising a housing having therein a circular fluid chamber, a shaft journalled axially of said chamber, teeth carried by said shaft for rotation therewith, a sleeve revoluble on said shaft and having teeth thereon, means for advancing said sleeve to engage its teeth with those carried by the shaft, an impeller rotatable with said sleeve within said chamber, means at one side of the chamber for preventing flow of fluid between the wall of the chamber and said impeller, a bypass communicating with the interior of the chamber on each side of said flow-preventing means, a valve interposed in said bypass, and means for closing said valve, said valve-closing means being operable after engagement of said teeth.

14. A hydraulic braking mechanism comprising a housing having therein a circular fluid chamber, a shaft journalled axially of said chamber, teeth carried by said shaft for rotation therewith, a sleeve revoluble on said shaft and having teeth thereon, means for advancing said sleeve to engage its teeth with those carried by the shaft, clutch means interposed between said shaft and said sleeve and engageable upon advance of the sleeve to rotate the sleeve in synchronism with said shaft before engagement of the teeth, an impeller rotatable with said sleeve within said chamber, means at one side of the chamber for preventing flow of fluid between the wall of the chamber and said impeller, a bypass communicating with the interior of the chamber on each side of said flow-preventing means, a valve interposed in said bypass, and means for closing said valve, said valve-closing means being operable after movement of the sleeve to engage said clutch and said teeth.

In testimony whereof I have signed my name to this specification.

DE FOREST KELLOGG.